United States Patent [19]
Hutar

[11] 3,720,009
[45] March 13, 1973

[54] DEVICE FOR THE MULTIDIMENSIONAL PRESENTATION OF QUALITATIVE AND QUANTITATIVE DATA

[76] Inventor: Laddie F. Hutar, 3800 Lake Shore Drive, Chicago, Ill. 60613

[22] Filed: Nov. 22, 1971

[21] Appl. No.: 201,073

[52] U.S. Cl. ................................... 35/24 R, 116/136
[51] Int. Cl. ............................................. G09b 19/18
[58] Field of Search ........ 35/1, 21, 23 A, 24 R, 24 A, 35/24 B, 24 C, 18 A; 116/136

[56] References Cited

UNITED STATES PATENTS

| | | | |
|---|---|---|---|
| 1,700,318 | 1/1929 | Karsten | 35/24 R |
| 2,316,147 | 4/1943 | Adams | 35/21 |
| 2,477,179 | 7/1949 | Hart | 35/18 A |
| 3,191,318 | 6/1965 | Hoffmann | 35/24 A X |
| 3,417,492 | 12/1968 | Rutland et al. | 35/24 R |
| 3,553,854 | 1/1971 | Biltz | 35/24 R |

*Primary Examiner*—Wm. H. Grieb
*Attorney*—Albert H. Pendleton et al.

[57] ABSTRACT

To cope with the "explosion" of qualitative and quantitative information available today and to present it in a comprehensive and usable form for a plurality of time periods, a multidimensional device is provided comprising an elongated hub means; a support means for rotatably mounting the hub means; and a multiplicity of projections supported by said hub means. The projections are arranged in a plurality of juxtaposed parallel planes along the hub means. The projections in each plane are distinguishable appearance-wise from each other, such as by a color coding, so as to qualitatively distinguish data. The pattern of distinguishable appearance is common to all the planes with like projections in successive parallel planes being in longitudinal alignment, whereby each plane may represent a finite time period. The length of each of the projections is adjustable so as to be quantitatively correlatable with the data. Particular embodiments have additional elements or features which increase the versatility and data handling capacity or render the device automatically adjustable by, for example, computer control.

22 Claims, 10 Drawing Figures

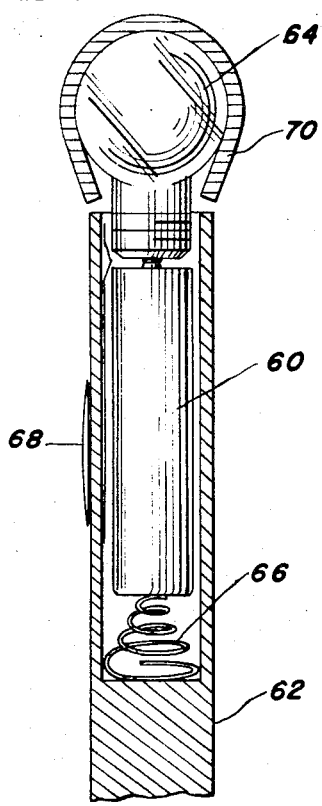
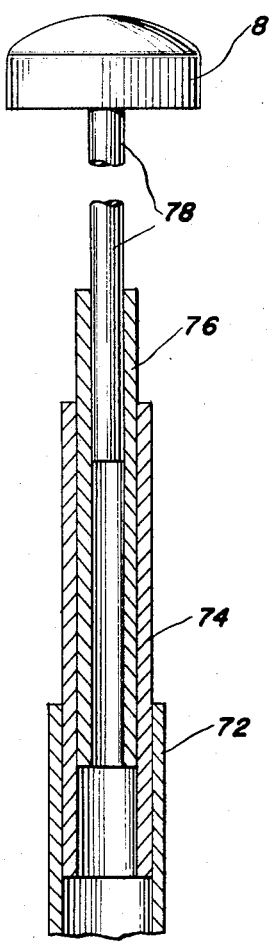
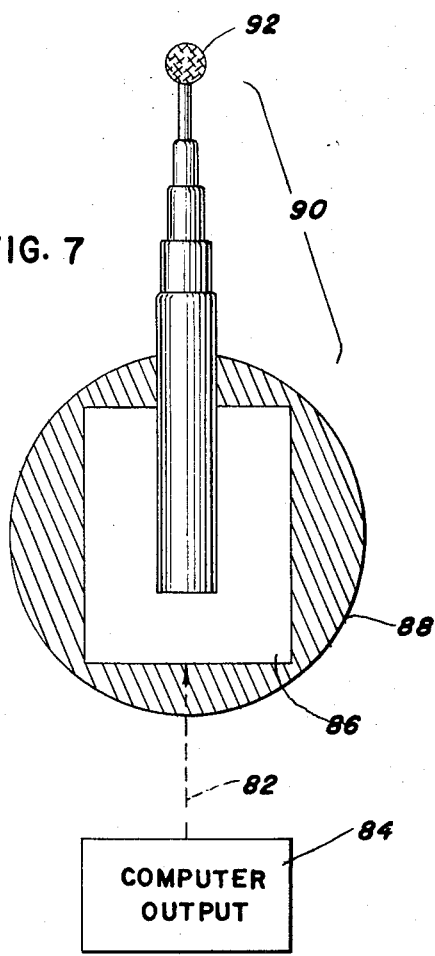
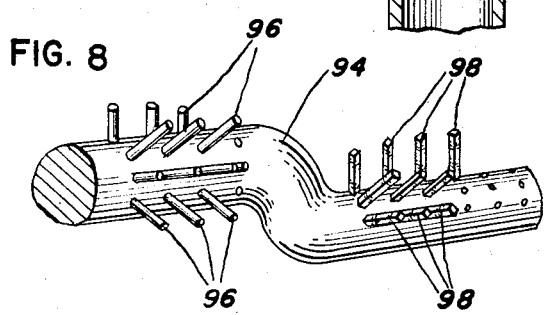
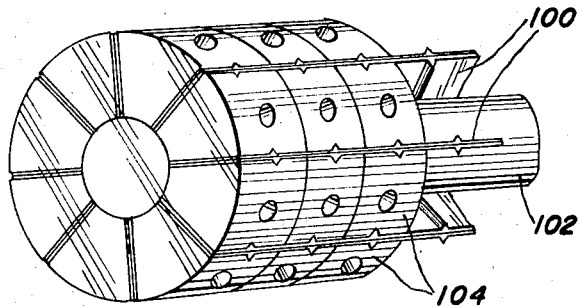
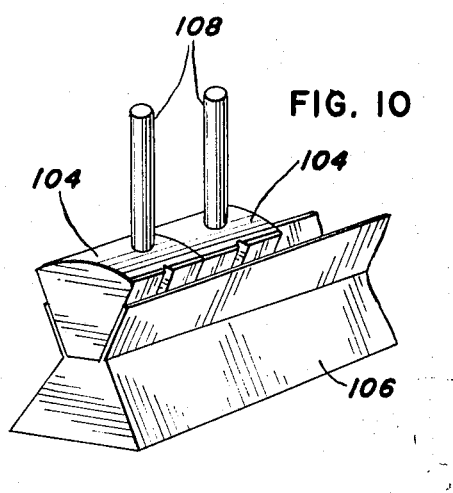

DEVICE FOR THE MULTIDIMENSIONAL PRESENTATION OF QUALITATIVE AND QUANTITATIVE DATA

BACKGROUND OF THE INVENTION

1. Field of the Invention

The present invention relates to a device for visually presenting qualitative and quantitative data and the changes therein extending over a finite time span. More specifically, it relates to a compact, multidimensional device which is capable of presenting a host of interrelated data covering successive time periods in a physical or tangible form which can be more-quickly and more-fully comprehended and understood.

While the present invention will be described with particular reference to certain advantageous embodiments employed in the presentation of business and financial data in visual and tangible form, it should be understood that the invention is not limited thereto. The device of the present invention can also be readily adapted to the effective visualization of a multiplicity of data in various fields, including, for example, government, military defense, education, the social sciences including psychology and sociology, medicine, science and engineering, as those skilled in the art will recognize in the light of the present disclosure.

2. Description of the Prior Art

In days gone by, managerial decisions were often made without sufficient factual foundations, sometimes with disastrous consequences. This sometimes resulted from a dearth of the right kind of data at the right time. In this day of systemized and sophisticated controls, often augmented by computer processing, however, the picture has drastically changed. While managerial decisions are still being made without a proper foundation, it is often not so much a lack of data but rather the inability to present and comprehend the plethora of data, both qualitative and quantitative, which is now being spewed forth day-in and day-out by modern hyper-speed computers. The gap between the availability of data and the comprehension and effective utilization of that data as a basis for managerial decisions promises to get worse before it becomes better.

Present-day techniques for coping with the information explosion leave much to be desired. The present-day manager is visual minded by conditioning and often resists the drudgery of attempting to comprehend and assimilate complex relationships when presented in the form of printed words such as in business reports and the like. To assist him, elaborate bar charts, line charts and other two-dimensional portrayers of information, whether in printed form, projected on screens, or presented in the form of easel-mounted charts, have commonly been resorted to. As those skilled in the arts of comprehension will testify, however, such visual aids are effectively limited to the presentation of only three to four items of information at one time. Thus, it is difficult to present an overall picture of complex data covering many facets of information, both qualitatively and quantitatively, particularly as they may change with the passage of time.

Even before the age of the computer, efforts were made to present data in physical form so as to render it more comprehensible and usable. Some of the prior art mechanical approaches took the form of two- and three-dimensional charts and various graphic and physical indicator systems. Illustrative of certain of these prior art efforts are the disclosures of U.S. Pat. Nos. 1,525,796, 1,700,318, 1,780,036, 2,316,147, 2,474,074, 2,925,669, 3,145,482, 3,307,170, and British Pat. No. 602,877.

Such prior art techniques, however, still left much to be desired. While helpful, the prior art effort suffered from one or more shortcomings such as, for example, restrictions on how many kinds of data could be effectively presented, limitations on the amounts of each type of data, the failure to effectively exhibit the data visually so that it can be quickly comprehended, the inability to portray complex interrelationships of different kinds of data, the undue complexity and high cost of certain devices and techniques, the lack of versatility of the data devices, and the like.

It is to the solution of this overall problem of data proliferation, data presentation, and data comprehension that the present invention is directed, as more fully reflected in the following objects. As used herein, the term "data" is to be construed broadly and is not necessarily limited to numerical information, unless so indicated. Thus, it can represent any type of information which is meaningful to the observer of the device herein described.

OBJECTS OF THE INVENTION

It is therefore a general object of the present invention to provide a device which effectively increases the control capability and span of control of man by presenting a multiplicity of data in a more-comprehensible form. It is another general object to provide a device which helps man cope with the "explosion" of qualitative and quantitative data which have become available for decision-making purposes. It is another general object to provide a communication device which helps to close the gap between availability of data and the comprehension and effective use of such data.

It is another general object to provide a device for the simplified and streamlined presentation of a multiplicity of interrelated qualitative and quantitative data. It is another general object to store data in a tangible "memory bank" which may be continuously and visually observed. It is another general object to provide a device for the storage of data which may be used in all facets of society, including, for example, government, military defense, education, the social sciences including psychology and sociology, medicine, science, engineering, business and finance.

It is a more specific object to provide a versatile, multidimensional device for the visual presentation of a multiplicity of data, which device may be physically compact and desk-size and yet lends itself to either simplicity or great sophistication, as desired. It is another specific object to provide a data exhibiter which provides one-glance comprehension of complex data and the ability to readily pinpoint critical aspects thereof. It is another specific object to provide a multidimensional device for the presentation of composite data, wherein particular types of data can be isolated for specific study.

It is another specific object to provide a device for presentinG qualitative and quantitatiVe data over a period of time, which lends itself to adjustment and updating by computer control. It is another specific object to provide an accumulator for complex data which, in its simplest embodiments, is low in cost and capable of adjustment and comprehension by the non-technical observer. It is still another specific object to provide a device for presenting data in tangible physical form, which device may be readily converted to the solution of various data exhibition tasks.

These and other objects of the present invention will become apparent as the detailed description thereof proceeds.

SUMMARY OF THE INVENTION

These objects are achieved, in brief, by a three-dimensional device comprising in combination an elongated hub means, a support means for rotatably mounting the hub means with the axis vertical, horizontal or at an intermediate angle, usually horizontal, and a multiplicity of projections supported by the hub means. The projections are arranged in spoke-like fashion in a plurality of juxtaposed parallel planes along the hub means with at least three of the projections being peripherally spaced around the hub means in each plane, usually evenly but not necessarily so. The number of projections in each plane is usually substantially equal, but not necessarily so, and the projections in each plane are distinguishable appearance-wise from each other such as, for example, by distinctive internal lighting, by characteristic shape or by color coding, preferably color coding.

The pattern of distinguishable appearance is common to all the planes, and projections in successive planes having the same distinguishable appearance are preferably arranged in longitudinal alignment. It is this distinctive appearance within each plane which permits data to be qualitatively distinguished. It is the plurality of planes which permits time spans to be presented, each plane representing a given period, e.g., a month, quarter-year, half-year, year, or whatever finite time span is desired.

To quantify the data, the length of each of the projections in each plane is adjustable whereby the length is correlatable with the data. In its simplest form, the projections are made adjustable by manufacturing them from a flangeable or otherwise severable material, e.g., soft metals, wood, plastic or the like. Thus, the length is then tailored by cutting or otherwise shortening the projections to correspond with the quantity being represented.

In a more sophisticated embodiment, the projections are radially extensible, which is readily accomplished by making them of telescoping elongated members. As those skilled in the art will recognize, the rod-like telescoping members may be adjusted by an electrical signal such as may be derived from a computer output. The magnitude, phase, frequency, polarity or other characteristic of the electrical signal, such as number of pulses thereof, can be correlatable with the data so as to adjust the telescoping member. The electrical means for so adjusting the telescoping members is per se not part of the present invention but is considered well within the skill of the art without further elaboration.

In all embodiments, the projections may bear indicia thereon whereby the length may indicate directly, or be convertible to, quantifiable data. The indexing may be by any convenient means such as, for example, in the case of a plastic projection, index marking and/or numerical values molded directly on the projections at appropriate intervals.

In certain particular embodiments, still other "dimensions" of information may be incorporated into the device, in addition to qualitative and quantitative data and finite time periods. For example, the elongated hub means may have a bent or otherwise deviated axis to indicate some meaningful information; or the thickness or the diameter of the hub may increase or decrease, progressively or otherwise, along its length. Also the hub means may be independently color coded or bear some visually distinguishable markings separate and apart from the coding of the projections themselves.

In still other embodiments, an additional dimension of information may be conveyed by expanded outer extremities on the projections. For example, when the projections are cylindrical rods, the extremities may bear enlarged spherical members or cubes having a separate color coding of their own. The outer extremities may also be electrically illuminable, the illumination itself being color coded.

In still other embodiments, the hub means may comprise a plurality of continual radial troughs extending the length of the axis, and the projections may be removably supported in the troughs by, for example, wedge-shaped segments. They may be secured in the troughs frictionally, magnetically or the like. Where particular data is to be scrutinized more carefully, a "line" of the wedge-shaped segments may be removed for closer examination.

Still another "dimension" of data may be incorporated by varying the cross sections of the projections. Thus, for example, in one instance the projections may comprise ¼ inch rods, whereas in another instance the projections may comprise ⅛ inch rods, the difference in diameter being significant information-wise. Similarly, the projections may have round, square, rectangular, curvilinear cross sections, or combinations thereof, each representing distinguishable information. In addition, individual projections may vary in cross section along the length thereof, e.g., a tapering cross section.

While the time periods are distinguished in the embodiments described herein by different planes, obvious equivalents will be apparent from the disclosure. Thus, for example, each plane could represent a different kind of qualitative information and the time "dimension" could be represented by the peripheral positions of projections in a given plane.

BRIEF DESCRIPTION OF THE DRAWINGS

The present invention will be more clearly understood from the following detailed description of specific embodiments read in conjunction with accompanying drawings, wherein:

FIG. 5 is a fragmentary section view of the outer portion of A projection, the extremity of which is electrically illuminable;

FIG. 6 is a fragmentary section view of a projection which is telescopically extendible;

FIG. 7 is a simplified schematic illustrating how the length of the projections may be adjusted responsive to a computer output;

FIG. 8 is a fragmentary perspective view illustrating a hub means with deviated axis;

FIG. 9 is a fragmentary perspective view of a hub means comprising radial trays or troughs with wedge-shaped segments for supporting the projections; and FIG. 10 is a fragmentary perspective view illustrating how the wedge-shaped segments of FIG. 9 may be removed for closer examination of the data represented by the projections.

It should be understood that the drawings are not necessarily to scale and that the embodiments are illustrated by graphic symbols and diagrammatic representations which may depart from actual appearances. In certain instances, details which are not necessary for an understanding of the present invention have been omitted It should be understood, of course, that the invention is not necessarily limited to the particular embodiments illustrated herein.

DETAILED DESCRIPTION OF THE DRAWINGS, INCLUDING PREFERRED EMBODIMENTS

Figure 1:
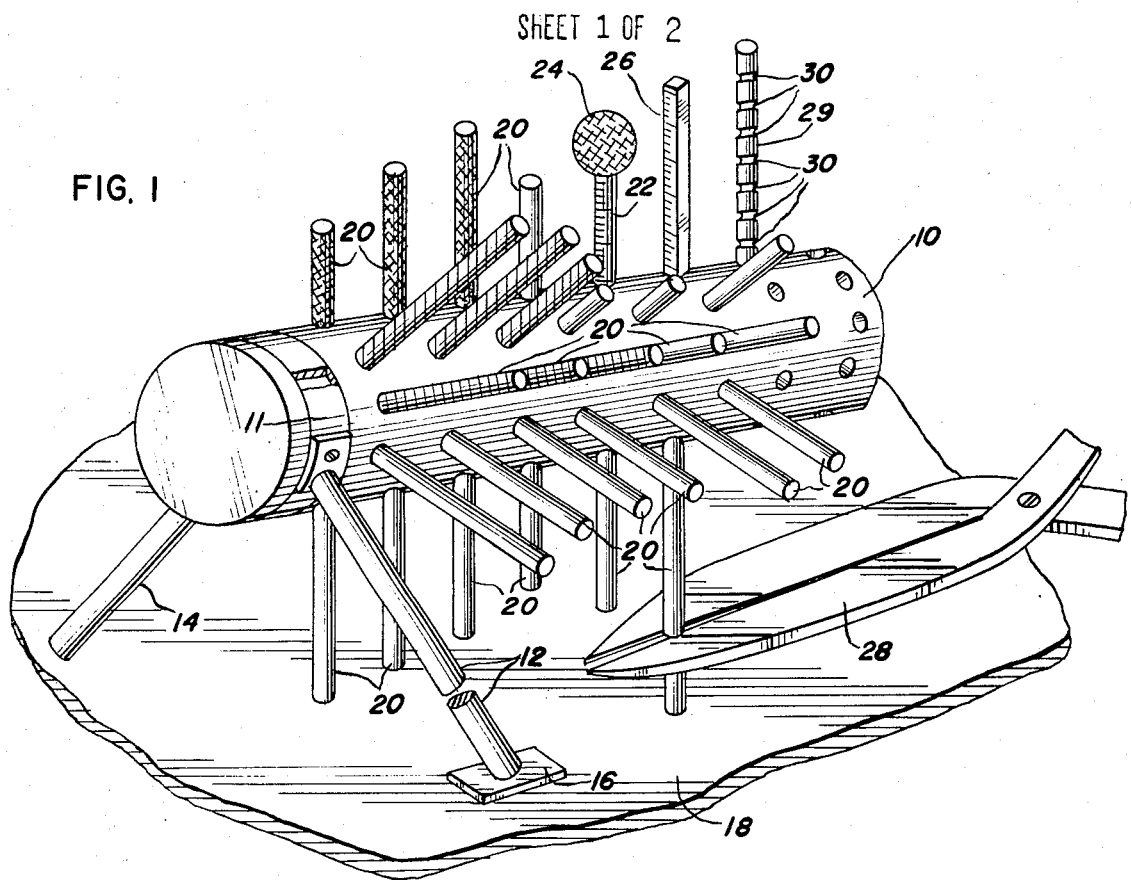
FIG. 1 is a fragmentary perspective view of a simplified version of the device of the present invention illustrating several embodiments of projections.

Referring to FIG. 1, the device comprises hollow or solid elongated hub means 10 which is rotatably mounted by means of swivel collar 11 on a support means comprising convergent legs 12 and 14 which support the device by means of pads 16 on surface 18. The support means may also comprise a simple cradle on which the elongated hub means rests, or equivalent thereof.

Projections 20 are arranged in the apertures of the hub means in spoke-like fashion in a plurality of juxtaposed parallel planes. They may be held in place in the apertures of the hub means 10 by a friction fit. The projections are preferably evenly spaced peripherally and the planes are evenly spaced axially along the hub means. The number of projections 20 in each plane is preferably the same, e.g., at least three; and the projections in each plane are distinguishable appearance-wise from each other, preferably by color coding, to be qualitatively distinct.

Projections 20 may also be distinguishable from one another by having a variety of configurations. This is illustrated, for example, by alternate embodiment 22 having enlarged outer extremity 24, and projection 26 having a square cross section.

The length of the projections may be adjusted to correspond to quantitative data by a variety of means. In the simplest form, the device of the present invention is provided with a supply of spoke-like members in a variety of colors and in a variety of graduated sizes. Thus, the proper size in the desired color may be selected corresponding to the quantity to be indicated.

In another embodiment, the device is supplied with spoke-like members having a variety of desired colors but of equal length. The spoke-like members are formed of a readily severable material, e.g., plastic or the like. They are then simply cut to proper size as suggested in FIG. 1 by scissors 28, before or after being inserted in the apertures of hub means 10.

The spoke-like members may also be indexed with periodic indentations which provide areas or points of weakness for ready fracture. This is illustrated by spoke-like member 29 having narrowed sections 30 distributed along the length thereof.

Figures 2, 3, 4:
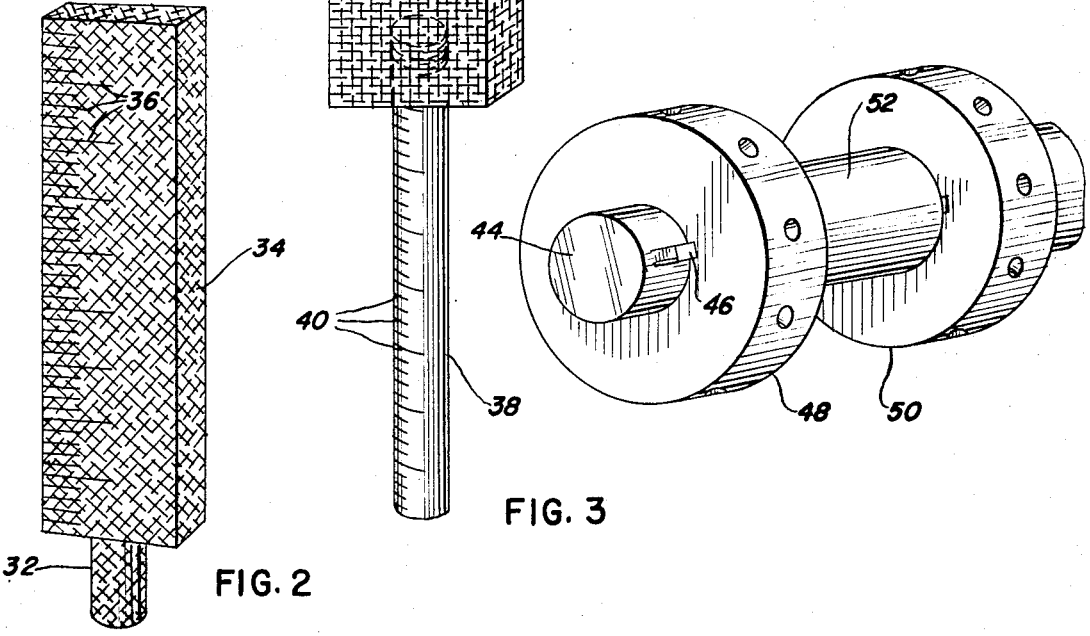
FIG. 2 is a perspective view on an expanded scale of another embodiment of the projections which may be employed in the device.
FIG. 3 is a fragmentary perspective view on the same expanded scale as FIG. 2 of still another embodiment of the projections which may be employed in the device.
FIG. 4 is a fragmentary perspective view of an alternate embodiment of the elongated hub means of the device.

As illustrated in FIG. 2, the projections may also comprise cylindrical stub 32, which may be inserted into an aperture in the hub means, and bar-like structure 34, which has a series of horizontal index marks 36 longitudinally disposed thereon. Instead of cylindrical stub 32, the extremity of bar-like structure 34 may be fitted into a corresponding rectangular slot in the hub means and held there frictionally, magnetically, or the like. When these bar-like structures are rotated to the upward vertical position, it presents, in effect, a bar chart of that particular row of data.

Still another embodiment of the projections is illustrated in FIG. 3. Projections 38 have a series of index markings 40 thereon. A color coded cube 42 may be frictionally attached to the extremity of projection 38 so as to convey another "dimension" of information.

Instead of the continuous cylindrical structure shown in FIG. 1, the hub means may comprise a series of annular discs, such as illustrated in FIG. 4. In this embodiment the hub means comprises inner shaft 44 which has an upraised key 46 thereon, on which there are assembled individual hubs 48 and 50. The hubs may be adjacent each other or spaced from one another, as illustrated in FIG. 4, by spacer cylinder 52 which fits around shaft 44. Key 46 and the corresponding indentation or slot in the hubs prevent relative rotation of the hubs whereby like colors in each plane may be held in alignment despite rotation of shaft 44.

Instead of spherical or rectilinear expansion of the extremities of the projections, it is also contemplated that the extremities may be electrically illuminated. A simplified version of this embodiment is illustrated in FIG. 5. In this embodiment dry cell battery 60 is housed in the hollow extremity of metallic projection 62 so as to illuminate lightbulb 64. The circuit is completed by means of metallic spring 66 and reciprocating switch 68, as in a conventional miniaturized flashlight.

Color coding is imparted to lightbulb 64 by means of transparent cap 70, preferably comprising a flexible plastic, which is colored to correspond to the desired coding. Cap 70 can be snapped onto or removed from the lightbulb whereby the color coding can be changed as desired.

The projections may also comprise a series of extendible rods, as illustrated in FIG. 6. In this figure the individual sections 72, 74, 76 and 78 telescope into each other in the same manner as a radio or TV antenna. Head 80 may be color coded as desired. The individual sections are adjusted manually and retain their position frictionally.

In FIG. 7 the individual sections may be automatically adjusted responsive to the output of a computer or other information-producing or storage device, e.g., magnetic-tape information devices, or combinations thereof. Thus, signal 82, e.g., an electrical signal, pneumatic signal, hydraulic signal, or the like, from computer 84 is transmitted to a control system represented by box 86 located in the center of hub means 88, whereby telescoping projection 90 or equivalent is raised or lowered depending upon the computer output. Again the extended area 92 at the extremity of projection 90 may be color coded, illuminated or otherwise designed to provide another "dimension" of information.

The control system of box 86 may employ conventional means for adjusting projection 90, which need not be telescoping, such as are presently employed for raising and lowering elongated members, e.g., antennas and the like. These include solenoid-controlled devices, continuously threaded members which are raised or lowered by rotation of the member itself or a complementary threaded collar, and telescoping devices which are raised or lowered by a confined internal cable. The means may also comprise an electric motor or equivalent controlling a spool of self-supporting steel tape in the same manner as disclosed in British Pat. No. 602,877. Pneumatic and hydraulic techniques can also be applied as those skilled in the pertinent arts will recognize in the light of the present disclosure.

In FIG. 8 the hub means 94 has a bent or deviated axis to represent another "dimension" of information. Thus, for example, projections 96 may represent historical, financial or business information prior to a particular merger, and projections 98 may represent results after a merger.

In FIG. 9, the hub means comprises a series of longitudinally-extending trays or troughs 100 arranged around the periphery of center core 102. Removable wedge-shaped segments 104 may be secured into the troughs by, for example, a snap fitting or frictionally or magnetically. In the magnetic embodiment, core 102 or the walls making up the trough-like receptacles 100 may be magnetized and the individual segments may contain iron or other material which is magnetically attracted.

Referring to FIG. 10, the individual segments 104 may be removed from the device of FIG. 9 and arranged in holder 106 whereby projections 108 may be more carefully scrutinized. Since holder 106 is not rotated to a downwardly facing vertical position, segments 104 need not be secured therein except gravitationally.

From the above description it is apparent that many "dimensions" of information may be conveyed by the device of the present invention. Each projection provides qualitative information distinguished from one another by a color coding. The length of the projection provides quantitative information and a time factor is injected by using a different plane for different time periods. Still other "dimensions" of information are provided by deviating the axis of the elongated hub means, by changing the shape of the projections, by adding expanded areas at the extremities of the projections, and by illuminating the ends thereof, including color coding as appropriate. Still another "dimension" of information results from the overall appearance of the device, particularly as compared to a model device.

From the above description it is apparent that the objects of the present invention have been achieved. While only certain embodiments have been set forth, alternate embodiments and various modifications will be apparent from the above description to those skilled in the art. For example, while the number of projections in axial or radial planes is depicted as being equal, manifestly the number of projections in certain axial or radial planes may be greater or less than the others. Thus, for example, data for past years may be presented on an annual basis, and data for the current year may be presented on a quarterly basis. These and other alternatives are considered equivalents and within the spirit and scope of the present invention.

Having described the invention, what is claimed is:

1. A device for multidimensional presentation of qualitatively and quantitatively-discrete data comprising in combination:
    a. elongated hub means;
    b. support means for rotatably mounting said hub means;
    c. a multiplicity of projections supported by said hub means;
        1. said projections being arranged substantially in a plurality of juxtaposed parallel planes along said hub means,
        2. at least three of said projections being peripherally-spaced around said hub means in each plane,
        3. the projections in each plane being distinguishable appearance-wise from each other to qualitatively distinguish data, the pattern of distinguishable appearance being common to all planes, like projections in successive parallel planes being in longitudinal alignment, and
        4. the length of each of said projections being adjustable so as to be quantitatively correlatable with the data.

2. The device of claim 1 wherein said elongated hub means comprises an elongated shaft having a plurality of individual hubs mounted thereon, each hub supporting the projections in at least one plane.

3. The device of claim 2 wherein the axis of said elongated shaft is straight.

4. The device of claim 2 wherein the axis of said elongated shaft is curved.

5. The device of claim 1 wherein said projections are in the form of rod-like members equally spaced around said hub means.

6. The device of claim 1 wherein said projections are radially extendible.

7. The device of claim 1 wherein each of said projections comprises a telescoping elongated member.

8. The device of claim 1 wherein each of said projections is longitudinally indexed whereby quantitative values are indicated thereby.

9. The device of claim 1 wherein said projections in each plane are color coded, the color coding being common to all planes.

10. The device of claim 1 wherein said projections have expanded outer extremities.

11. The device of claim 10 wherein said extremities bear a color coding.

12. The device of claim 1 wherein said projections are electricallyIluminable adjacent an outer extremity thereof.

13. The device of claim 12 wherein the illumination is color coded.

14. The device of claim 1 wherein said projections are adjusted in length by an electrical input.

15. The device of claim 14 wherein said electrical input is responsive to the output of a computer.

16. The device of claim 1 wherein said hub means comprises a plurality of radial troughs extending the length thereof and said projections are removably supported in said troughs by wedge-shaped segments.

17. The device of claim 16 wherein said wedge-shaped segments are removably supported in said troughs magnetically.

18. The device of claim 1 wherein said projections have varying cross sections, the cross sections being correlatable with other aspects of the data.

19. A device for multidimensional presentation of qualitative and quantitative information for a plurality of time periods comprising in combination:
   a. elongated hub means;
   b. support means for rotatably mounting said hub means;
   c. a multiplicity of elongated projections supported by said hub means,
      1. said projections being arranged substantially in a plurality of successive parallel planes along said hub means,
      2. at least three of said projections being supported in each plane, the number of said projections in each plane being substantially equal,
      3. the projections in each plane being color coded, the color coding being common to all planes, and
      4. said projections comprising rod-like members of adjustable length,
   whereby the color coding, the adjustable length and the disposition of the projections are correlatable with distinct aspects of the information.

20. The device of claim 19 wherein the length of said rod-like members is adjustable responsive to the output of a computer.

21. The device of claim 19 wherein the color coding is correlatable with qualitative information, the length of the rod-like members is correlatable with quantitative information and each of said parallel planes represents a different time period.

22. The device of claim 19 wherein the color coding is correlatable with different time periods, each plane represents a different type of qualitative information and the length of the rod-like members is correlatable with quantitative information.

* * * * *

UNITED STATES PATENT OFFICE
CERTIFICATE OF CORRECTION

Patent No. 3,720,009            Dated  March 13, 1973

Inventor(s) Laddie F. Hutar

It is certified that error appears in the above-identified patent and that said Letters Patent are hereby corrected as shown below:

Column 2, line  5, change "British" to --Canadian--.

Column 2, line 66, change "presentinG" to --presenting--.

change "quantitatiVe" to --quantitative--.

Column 3, line  2, change "accumulatOr" to --accumulator--.

change "comPlex" to --complex--.

Column 3, line 21, change "fashiOn" to --fashion--.

Column 3, line 25, change "usuallY" to --usually-.

change "necessarilY" to --necessarily--.

Column 4, line 21, change "Are" to --are--.

Column 4, line 41, change "In" to --in--.

Column 4, line 50, change "bodimentS" to --bodiments--.

Column 4, line 59, change "fRom" to --from--.

Column 4, line 62, change "vieW" to --view--.

Column 5, line  9, change "pOrtion" to --portion--.

change "A" to --a--.

Column 5, line 12, change "iS" to --is--.

UNITED STATES PATENT OFFICE
CERTIFICATE OF CORRECTION

Patent No. 3,720,009          Dated    March 13, 1973

Inventor(s)   Laddie F. Hutar

It is certified that error appears in the above-identified patent and that said Letters Patent are hereby corrected as shown below:

Column 5, line 55, change "tiOns" to --tions--.

Column 7, line 1, change "sectionS" to --sections--.

Column 7, line 3, change "deVice" to --device--.

Column 7, line 26, change "sPool" to --spool--.

Column 8, line 26, change "means;" to --means,--.

Column 8, line 37, change "succeSsive" to --successive--.

Column 9, line 2, change "electricallylluminable" to --electrically-illuminable--.

Signed and sealed this 5th day of March 1974.

(SEAL)
Attest:

EDWARD M. FLETCHER, JR.
Attesting Officer

C. MARSHALL DANN
Commissioner of Patents